US008694651B2

(12) United States Patent
Li (10) Patent No.: US 8,694,651 B2
(45) Date of Patent: Apr. 8, 2014

(54) METHOD AND SYSTEM FOR IMPLEMENTING NETWORK PROXY

(75) Inventor: Yongyong Li, Shenzhen (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 92 days.

(21) Appl. No.: 13/399,518

(22) Filed: Feb. 17, 2012

(65) Prior Publication Data

US 2012/0151070 A1    Jun. 14, 2012

Related U.S. Application Data

(63) Continuation of application No. PCT/CN2010/075348, filed on Jul. 21, 2010.

(30) Foreign Application Priority Data

Aug. 17, 2009 (CN) .......................... 2009 1 0166303

(51) Int. Cl.
    *G06F 15/16*         (2006.01)
(52) U.S. Cl.
    USPC ........................................................ 709/227
(58) Field of Classification Search
    USPC ........................................................ 709/227
    See application file for complete search history.

(56) References Cited

U.S. PATENT DOCUMENTS

| | | | | |
|---|---|---|---|---|
| 7,237,257 B1 * | 6/2007 | Hirsh | ............................... | 726/10 |
| 7,743,160 B2 * | 6/2010 | Li et al. | ......................... | 709/230 |
| 8,326,277 B2 * | 12/2012 | Hughes et al. | ................ | 455/416 |
| 2005/0207397 A1 * | 9/2005 | Berndt et al. | ................. | 370/352 |
| 2005/0232407 A1 * | 10/2005 | Craig et al. | .................... | 379/229 |
| 2007/0078986 A1 * | 4/2007 | Ethier et al. | ................... | 709/227 |
| 2008/0046717 A1 * | 2/2008 | Kanekar et al. | .............. | 713/156 |
| 2008/0151917 A1 * | 6/2008 | Bartlett et al. | ................ | 370/401 |
| 2009/0013210 A1 * | 1/2009 | McIntosh et al. | ................ | 714/4 |
| 2009/0249131 A1 * | 10/2009 | Mitomo | ......................... | 714/48 |

FOREIGN PATENT DOCUMENTS

| | | |
|---|---|---|
| CN | 1476181 A | 2/2004 |
| CN | 1921438 A | 2/2007 |
| CN | 101345741 A | 1/2009 |
| WO | WO 2005/036857 A1 | 4/2005 |
| WO | WO 2011/020397 A | 2/2011 |

OTHER PUBLICATIONS

Extended European Search Report in corresponding European Patent Application No. 10809530.8 (Aug. 30, 2012).

(Continued)

*Primary Examiner* — Waseem Ashraf
(74) *Attorney, Agent, or Firm* — Leydig, Voit & Mayer, Ltd.

(57) ABSTRACT

A method and system for implementing network proxy are provided. The method includes: establishing a first connection between a client and a server through a proxy adapter, so as to enable the client to acquire status information of the server through the first connection; and if the status information of the server shows that the server is in a turn-on state, establishing a second connection between the client and the server, so as to enable the client and the server to transmit a data packet through the second connection. Through the method for implementing network proxy, the client acquires the status information of the server through the first connection, and only when the status information of the server is the turn-on state, could the second connection between the client and the server be established, thereby ensuring the reliability of establishing the second connection, and improving the user experience.

12 Claims, 5 Drawing Sheets

A system for implementing network proxy (56) References Cited

OTHER PUBLICATIONS

International Search Report in corresponding PCT Application No. PCT/CN2010/075348 (Nov. 18, 2010).

State Intellectual Property Office of the People's Republic of China, 1st Office Action in Chinese Application No. 200910166303.X (Nov. 10, 2011).

International Searching Authority, Written Opinion in International Application No. PCT/CN2010/075348 (Nov. 18, 2010).

* cited by examiner

METHOD AND SYSTEM FOR IMPLEMENTING NETWORK PROXY

CROSS-REFERENCE TO RELATED APPLICATIONS

This application is a continuation of International Application No. PCT/CN2010/075348, filed on Jul. 21, 2010, which claims priority to Chinese Patent Application No. 200910166303.X, filed on Aug. 17, 2009, both of which are hereby incorporated by reference in their entireties.

FIELD OF THE INVENTION

The present invention relates to the field of computer network technologies, and in particular to a method and system for implementing network proxy.

BACKGROUND OF THE INVENTION

With the popularization and application of the network, the network security problems such as network attack, virus file propagation, and junk mail proliferation are becoming increasingly serious. Gateway apparatuses such as a firewall, a virus gateway, and a mail gateway emerge to meet the urgent demands of operators and enterprise users. In order to restore the application data of a data stream, the gateway apparatus first needs to buffer the application data of the data stream. In a process of buffering the application data, a proxy gateway serves as both a client and a server, which communicates with a real server and a real client respectively, so as to intercept and buffer the application data. In this process, the real client and the real server generally do not know the true identities of the peers with which the real client and the real server interact to transmit data. In a process of establishing a connection between the client and the server, the gateway apparatus generally begins to perform full proxy during three times handshake, the client establishes a connection with a proxy server of the gateway apparatus, and a proxy client of the gateway apparatus establishes a connection with the server.

During the implementation of the present invention, the inventor finds that, in the conventional art, the proxy client may figure out whether the server is in an active state only after establishing the connection with the server through initiating the three times handshake. Also, after the client establishes the connection with the server, if the server is in a turn-off state, the connection between the proxy client and the server is disconnected soon after being established, thereby interrupting the user experience.

SUMMARY OF THE INVENTION

Embodiments of the present invention provide a method and system for implementing network proxy, so that a client establishes a proxy connection after acquiring status information of a server, thereby ensuring the reliability of establishing a second connection between the client and the server, and improving the user experience.

An embodiment of the present invention provides a method for implementing network proxy, which includes:

establishing a first connection between a client and a server, so as to enable the client to acquire status information of the server through the first connection; and if the status information of the server shows that the server is in a turn-on state, establishing a second connection between the client and the server, so as to enable the client and the server to transmit a data packet through the second connection.

An embodiment of the present invention further provides a system for implementing network proxy, which includes:

a first establishment module, configured to establish a first connection between a client and a server, so as to enable the client to acquire status information of the server through the first connection; and a second establishment module, configured to, when the status information of the server shows that the server is in a turn-on state, establish a second connection between the client and the server, so as to enable the client and the server to transmit a data packet through the second connection.

Through the method and system for implementing network proxy provided by the embodiments of the present invention, the first connection is established before the second connection between the client and the server is established, so that the client acquires the status information of the server through the first connection, and only when the status information of the server is the turn-on state, could the second connection be established, thereby ensuring the reliability of establishing the second connection between the client and the server, and improving the user experience.

BRIEF DESCRIPTION OF THE DRAWINGS

To illustrate the technical solutions according to the embodiments of the present invention more clearly, the accompanying drawings for describing the present invention or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly and fully described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
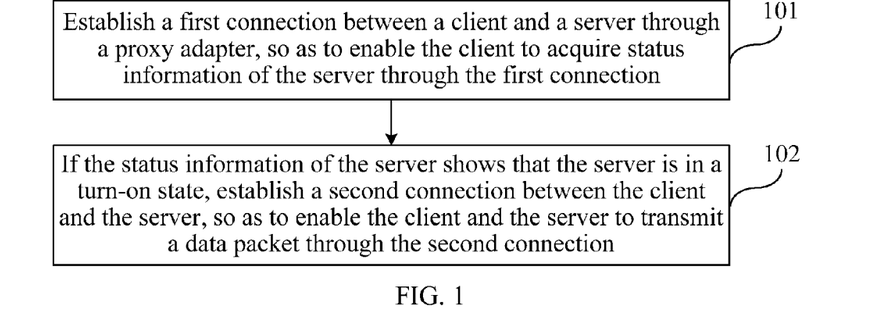
FIG. 1 is a schematic flow chart of a method for implementing network proxy according to an embodiment of the present invention.

FIG. 1 is a schematic flow chart of a method for implementing network proxy according to an embodiment of the present invention. As shown in FIG. 1, the method of this embodiment includes the following steps.

Step 101: Establish a first connection between a client and a server through a proxy adapter, so as to enable the client to acquire status information of the server through the first connection.

Step 102: If the status information of the server shows that the server is in a turn-on state, establish a second connection between the client and the server, so as to enable the client and the server to transmit a data packet through the second connection.

Through the method for implementing network proxy according to the embodiment of the present invention, the first connection is established before the second connection between the client and the server is established, so that the client acquires the status information of the server through the first connection, and only when the status information of the server is the turn-on state, could the second connection be established, thereby ensuring the reliability of establishing the second connection between the client and the server, and improving the user experience.

Figure 2:
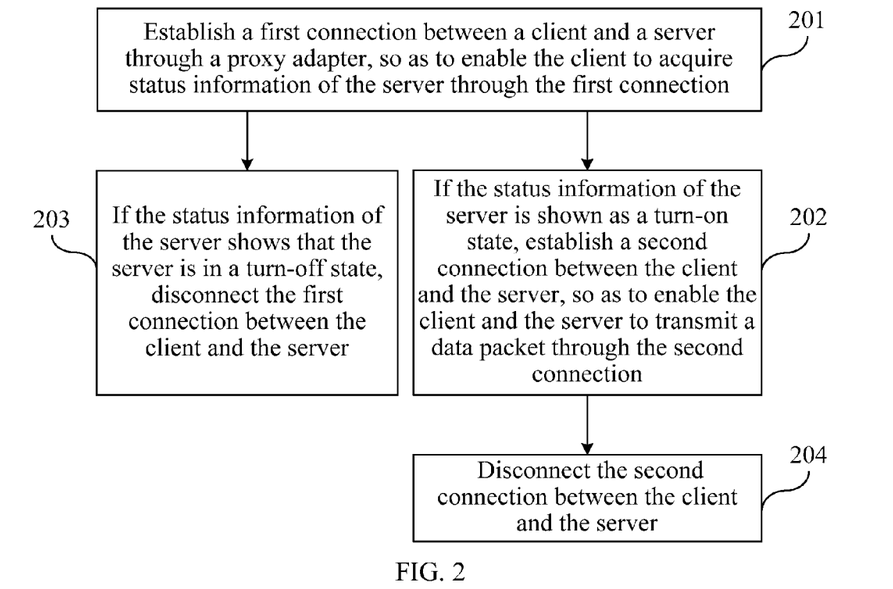
FIG. 2 is a schematic flow chart of a method for implementing network proxy according to another embodiment of the present invention.
Figure 3:
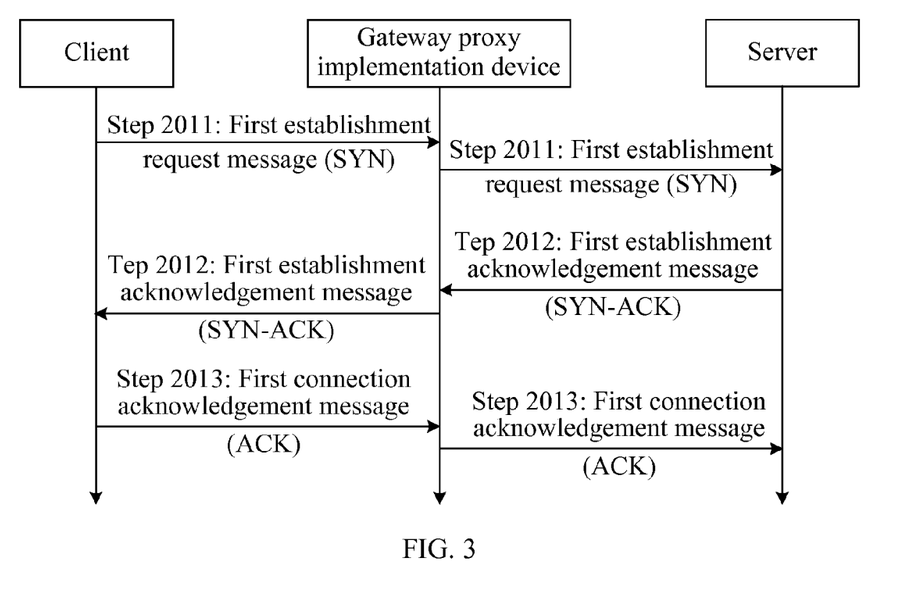
FIG. 3 is a signaling flow chart of establishing a first connection according to the embodiment shown in FIG. 2.
Figure 4:
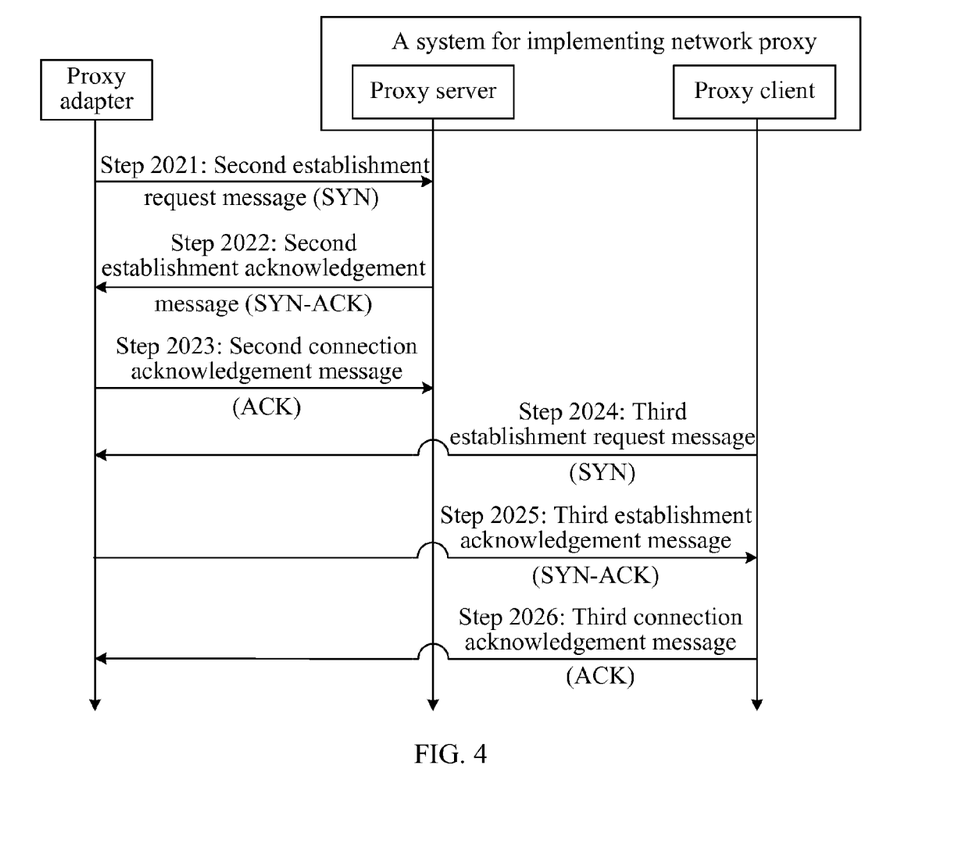
FIG. 4 is a signaling flow chart of establishing a second connection according to the embodiment shown in FIG. 2.
Figure 5:
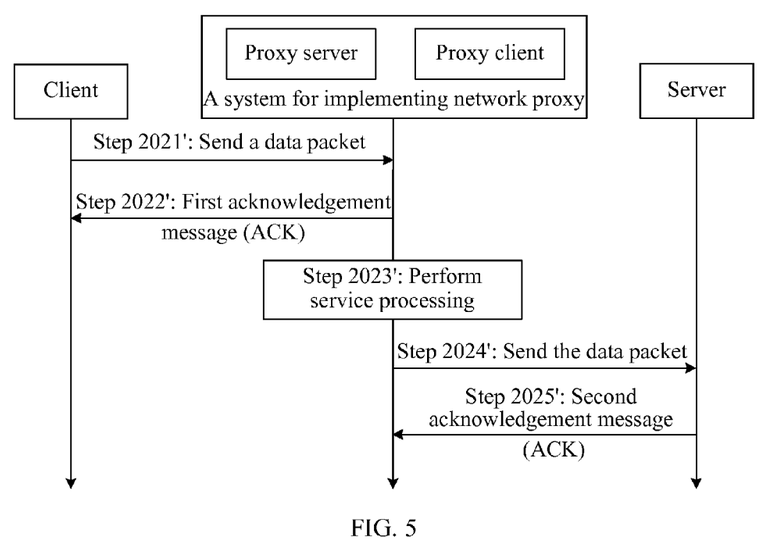
FIG. 5 is a signaling flow chart of sending a data packet between a client and a server according to the embodiment shown in FIG. 2.
Figure 6:
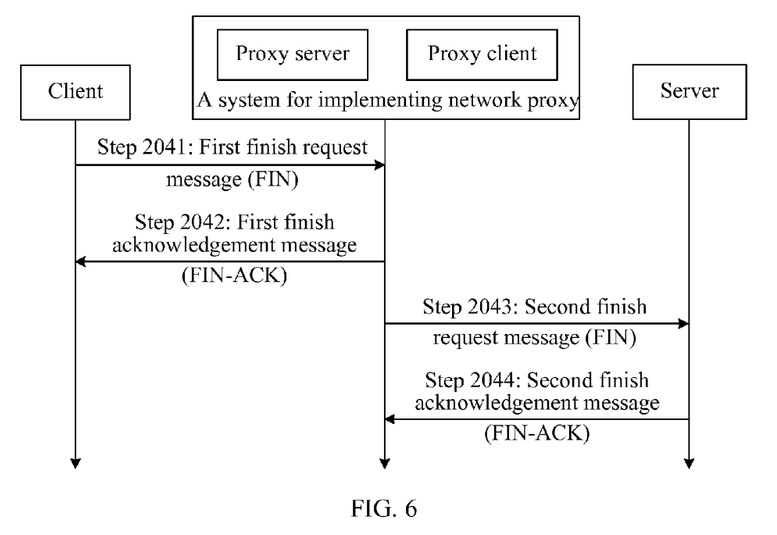
FIG. 6 is a signaling flow chart of disconnecting the second connection according to the embodiment shown in FIG. 2.

FIG. 2 is a schematic flow chart of a method for implementing network proxy according to another embodiment of the present invention. FIG. 3 is a signaling flow chart of establishing a first connection according to the embodiment shown in FIG. 2. FIG. 4 is a signaling flow chart of establishing a second connection according to the embodiment shown in FIG. 2. FIG. 5 is a signaling flow chart of sending a data packet between a client and a server according to the embodiment shown in FIG. 2. FIG. 6 is a signaling flow chart of disconnecting the second connection according to the embodiment shown in FIG. 2.

As shown in FIG. 2, the method of this embodiment includes the following steps.

Step 201: Establish a first connection between a client and a server through a proxy adapter, so as to enable the client to acquire status information of the server through the first connection.

Step 202: If the status information of the server is shown as a turn-on state, establish a second connection between the client and the server, so as to enable the client and the server to transmit a data packet through the second connection.

Step 203: If the status information of the server shows that the server is in a turn-off state, disconnect the first connection between the client and the server.

Step 204: Disconnect the second connection between the client and the server.

Exemplarily, in step 201, the first connection between the client and the server may be implemented through a three times handshake protocol of the Transmission Control Protocol (TCP). Specifically, as shown in FIG. 3, a process of establishing the first connection may include the following steps.

Step 2011: A system for implementing network proxy receive a first establishment request message (SYN) sent by the client and sends the first establishment request message to the server.

Step 2012: The system for implementing network proxy receive a first establishment acknowledgement message (SYN-ACK) returned from the server and sends the first establishment acknowledgement message to the client.

Step 2013: The system for implementing network proxy receive a first connection acknowledgement message (ACK) returned from the client and sends the first connection acknowledgement message to the server.

After steps 2011 to 2013 are completed, the first connection may be established between the server and the client through the system for implementing network proxy.

Exemplarily, in step 202, if the status information of the server acquired by the client shows that the server is in the turn-on state, the second connection is established between the client and the server through the system for implementing network proxy. Specifically, as shown in FIG. 4, a process of establishing the second connection include: establishing a third connection between the proxy adapter and a proxy server through three times handshake of the TCP, and establishing a fourth connection between the proxy adapter and a proxy client through the three times handshake of the TCP, so as to form the second connection between the client and the server through the third connection and the fourth connection. The detail steps are shown as follows.

Step 2021: A proxy server of the system for implementing network proxy receives a second establishment request message (SYN) sent by a proxy adapter masquerading as the client.

Step 2022: The proxy server sends a second establishment acknowledgement message (SYN-ACK) to the proxy adapter according to the second establishment request message.

Step 2023: The proxy server receives a second connection acknowledgement message (ACK) sent by the proxy adapter according to the second establishment acknowledgement message.

After the three times handshake of the TCP in steps 2021 to 2023, the third connection may be established between the proxy server and the proxy adapter through the system for implementing network proxy.

Step 2024: A proxy client of the system for implementing network proxy sends a third establishment request message (SYN) to the proxy adapter.

Step 2025: The proxy client receives a third establishment acknowledgement message (SYN-ACK) sent by the proxy adapter according to the third establishment request message.

Step 2026: The proxy client sends a third connection acknowledgement message (ACK) to the proxy adapter according to the third establishment acknowledgement message.

After the three times handshake of the TCP in steps 2024 to 2026, the fourth connection may be established between the proxy client and the proxy adapter through the system for implementing network proxy.

Furthermore, if the status information of the server acquired by the client is the turn-on state, specifically, as shown in FIG. 5, the transmitting the data packet through the second connection between the client and the server via the system for implementing network proxy may include the following steps.

Step 2021': The proxy server of the system for implementing network proxy receives the data packet sent by the client through the third connection.

Step 2022': After receiving the data packet, the proxy server returns a first acknowledgement message (ACK) to the client.

Step 2023': The system for implementing network proxy performs service processing on the data packet.

The performing the service processing on the data packet may include performing virus scanning on the data packet or filtering the data packet.

Step 2024': The proxy client of the system for implementing network proxy sends the processed data packet to the server through the fourth connection.

Step 2025': The proxy client receives a second acknowledgement message (ACK) returned by the server after the server receives the data packet.

Exemplarily, in step 204, as shown in FIG. 6, the disconnecting, by the system for implementing network proxy, the second connection between the client and the server may specifically include the following steps.

Step 2041: The proxy server of the system for implementing network proxy receives a first finish request message (FIN) sent by the client.

Step 2042: The proxy server returns a first finish acknowledgement message (FIN-ACK) to the client according to the received first finish request message.

Step 2043: The proxy client of the system for implementing network proxy sends a second finish request message (FIN) to the server.

Step 2044: The proxy client receives a second finish acknowledgement message (FIN-ACK) returned by the server according to the second finish request message.

Through the method for implementing network proxy according to the embodiment of the present invention, the first connection is established before the second connection between the client and the server is established, so that the client acquire the status information of the server through the first connection, and only when the status information of the server is the turn-on state, the second connection is established, thereby ensuring the reliability of establishing the second connection between the client and the server, and the establishment of the second connection shields the service processing of the data packet from a complex state of network links, thereby improving the user experience.

Figure 7:
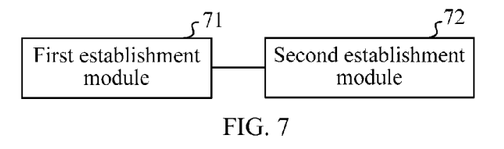
FIG. 7 is a schematic structure diagram of a system for implementing network proxy according to an embodiment of the present invention.

FIG. 7 is a schematic structure diagram of a system for implementing network proxy according to an embodiment of the present invention. As shown in FIG. 7, the system of this embodiment includes a first establishment module 71 and a second establishment module 72.

The first establishment module 71 is configured to establish a first connection between a client and a server through a proxy adapter, so as to enable the client to acquire status information of the server through the first connection.

The second establishment module 72 is configured to establish a second connection between the client and the server when the status information of the server shows that the server is in a turn-on state, so as to enable the client and the server to transmit a data packet through the second connection.

Through the system for implementing network proxy according to the embodiment of the present invention, the first connection is established by the first establishment module 71 before the second connection between the client and the server is established by the second establishment module 72, so that the client acquires the status information of the server through the first connection, and only when the status information of the server is the turn-on state, could the second connection be established, thereby ensuring the reliability of establishing the second connection between the client and the server, and improving the user experience.

Figure 8:
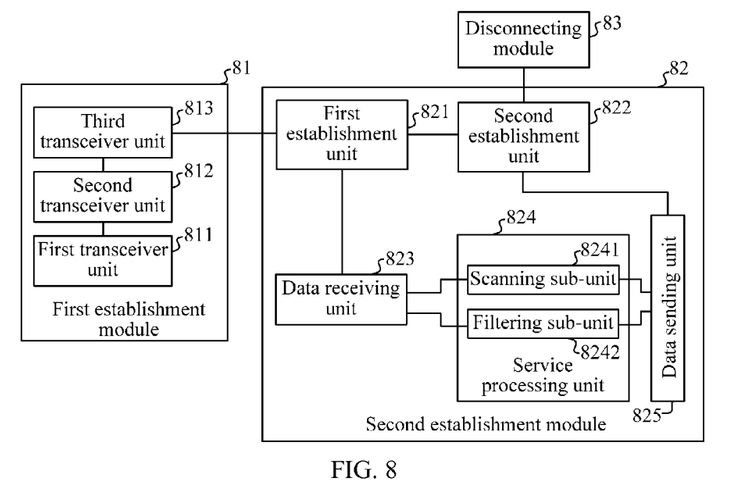
FIG. 8 is a schematic structure diagram of a system for implementing network proxy according to another embodiment of the present invention.

FIG. 8 is a schematic structure diagram of a system for implementing network proxy according to another embodiment of the present invention. As shown in FIG. 8, the system of this embodiment includes a first establishment module 81, a second establishment module 82, and a disconnecting module 83.

The first establishment module 81 establishes a first connection between a client and a server through a proxy adapter, so as to enable the client to acquire status information of the server through the first connection. If the status information of the server is a turn-on state, the second establishment module 82 establishes a second connection between the client and the server, so as to enable the client and the server to transmit a data packet through the second connection. The disconnecting module 83 is configured to disconnect the second connection between the client and the server.

Furthermore, the first establishment module 81 may further include a first transceiver unit 811, a second transceiver unit 812, and a third transceiver unit 813. The first transceiver unit 811 receives a first establishment request message (SYN) sent by the client and sends the first establishment request message to the server. The second transceiver unit 812 receives a first establishment acknowledgement message (SYN-ACK) returned from the server and sends the first establishment acknowledgement message to the client. The third transceiver unit 813 receives a first connection acknowledgement message (ACK) returned from the client and sends the first connection acknowledgement message to the server. In the foregoing process, the first connection between the client and the server is established.

Furthermore, the second establishment module 82 may further include a first establishment unit 821 and a second establishment unit 822. The first establishment unit 821 is configured to establish a third connection between the proxy adapter and the proxy server through three times handshake. The second establishment unit 822 is configured to establish a fourth connection between the proxy adapter and the proxy client through the three times handshake. In this way, the second connection between the client and the server is formed through the third connection established by the first establishment unit 821 and the fourth connection established by the second establishment unit 822.

Furthermore, a process of establishing the third connection by the first establishment unit 821 may be as follows. The first establishment unit 821 receives a second establishment request message sent by the proxy adapter masquerading as the client, sends a second establishment acknowledgement message to the proxy adapter according to the second establishment request message, and receives a second connection acknowledgement message sent by the client according to the second establishment acknowledgement message. In the foregoing process, the first establishment unit 821 may implement the third connection between the proxy adapter and a system for implementing network proxy. A process of establishing the fourth connection by the second establishment unit 822 may be as follows. The second establishment unit 822 sends a third establishment request message to the proxy adapter, receives a third establishment acknowledgement message sent by the proxy adapter according to the third establishment request message, and sends a third connection acknowledgement message to the proxy adapter according to the third establishment acknowledgement message. In this way, the second establishment unit 822 may implement the fourth connection between the proxy adapter and the system for implementing network proxy.

The second establishment module 82 may further include a data receiving unit 823, a service processing unit 824, and a data sending unit 825. The data receiving unit 823 receives the data packet sent by the client through the third connection established by the first establishment unit 821. The service processing unit 824 performs service processing on the data packet. The data sending unit 825 sends the processed data packet to the server through the fourth connection established by the second establishment unit 822.

Furthermore, the service processing unit 824 may include: a scanning sub-unit 8241, which is configured to perform virus scanning on the data packet; and/or a filtering sub-unit 8242, which is configured to filter the data packet.

Through the system for implementing network proxy according to the embodiment of the present invention, the first connection is established by the first establishment module 81 before the second connection between the client and the server is established by the second establishment module 82, so that the client acquires the status information of the server through the first connection, and only when the status information of the server is shown as the turn-on state, could the second connection be established, thereby ensuring the reliability of establishing the second connection between the client and the server, and the establishment of the second connection shields the service processing of the data packet from a complex state of network links, thereby improving the user experience.

Figure 9:
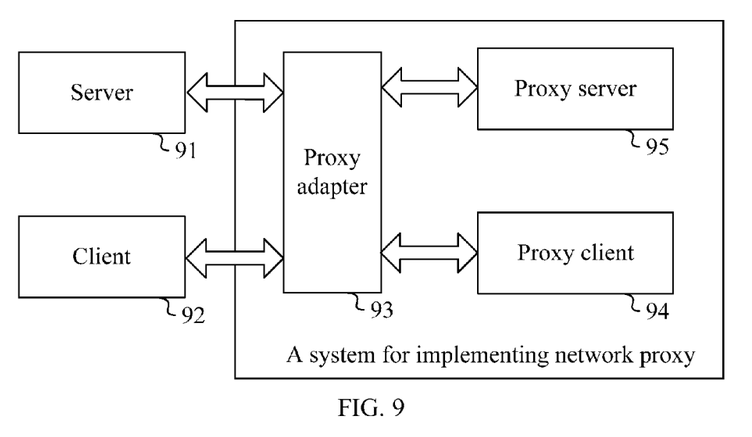
FIG. 9 is a schematic structure diagram of an applicable system according to an embodiment of the present invention.

FIG. 9 is a schematic structure diagram of an applicable system according to an embodiment of the present invention. As shown in FIG. 9, the applicable system according to this embodiment includes a client 91, a server 92, a proxy adapter 93, a proxy client 94, and a proxy server 95. The proxy adapter 93, the proxy client 94, and the proxy server 95 form a system for implementing network proxy according to the embodiment of the present invention.

When the client 91 needs to send a data packet to the server 92 through the system for implementing network proxy, the client 91 needs to establish a connection with the server through three times handshake. A specific process of the three times handshake is as follows. After receiving a first connection establishment request message (SYN) sent by the client 91, the proxy adapter 93 sends the first connection establishment request message to the server 92. The server 92 sends a first establishment acknowledgement message (SYN-ACK) to the proxy adapter 93. The proxy adapter 93 sends the first establishment acknowledgement message to the client 91. After receiving the first establishment acknowledgement message, the client 91 sends a first connection acknowledgement message (ACK), and the proxy adapter 93 sends the first connection acknowledgement message (ACK) to the server. In this way, a first connection between the client 91 and the server 92 is established. The client 91 may acquire status information of the server 92 through the first connection, that is, the client 91 may acquire whether the server 92 is in a turn-on state or in a turn-off state, and further determine whether to establish a second connection subsequently according to the acquired status information.

When the status information of the server 92 acquired by the client 91 is the turn-on state, the proxy adapter 93 masquerades as the client to send a second establishment request message (SYN) to the proxy server 95 through a virtual network card. The proxy server 95 sends a second establishment acknowledgement message (SYN-ACK) to the proxy adapter 93 through the virtual network card according to the received second establishment request message (SYN). And the proxy adapter 93 masquerades as the client to send a second connection acknowledgement message (ACK) to the proxy server 95 through the virtual network card according to the received second establishment acknowledgement message (SYN-ACK). Through three times handshake of the TCP, a system for implementing network proxy may establish a third connection between the proxy server 95 and the proxy adapter 93. Then, the proxy client 94 sends a third establishment request message (SYN) to the proxy adapter 93. The proxy client 94 receives a third establishment acknowledgement message (SYN-ACK) sent by the proxy adapter 93 according to the third establishment request message. The proxy client 94 sends a third connection acknowledgement message (ACK) to the proxy adapter 93 according to the third establishment acknowledgement message. Through three times handshake of the TCP, the system for implementing network proxy may establish a fourth connection between the proxy client 94 and the proxy adapter 93. After the third connection and the fourth connection are established, a second connection between the client 91 and the server 92 may be formed through the third connection and the fourth connection.

After the second connection is established, the client 91 sends the data packet through the proxy adapter 93. The proxy adapter 93 redirects the data packet to the virtual network card. The virtual network card sends the data packet to the system for implementing network proxy. The system for implementing network proxy performs service processing on the data packet, and specifically, performs virus scanning on the data packet or filters the data packet. After the system for implementing network proxy sends the processed data packet to the proxy adapter 93 through the virtual network card, the proxy adapter 93 redirects the data packet and then sends the data packet to the server 92.

When the data packet is transmitted completely, an operation of disconnecting a connection may also be performed and is specifically as follows.

The client 91 sends a first finish request message (FIN) to the proxy server 95. The proxy server 95 returns a first finish acknowledgement message (FIN-ACK) to the client 91 according to the first finish request message. The proxy client 94 sends a second finish request message (FIN) to the server 92. The proxy client 94 receives a second finish acknowledgement message (FIN-ACK) returned by the server 92 according to the second finish request message, and ends the current processing of the data packet.

In the applicable system according to the embodiment of the present invention shown in FIG. 9, if the system for implementing network proxy is specifically an anti-virus gateway, a specific process is described as follows by taking a Hypertext Transfer Protocol (HTTP) as an example. The anti-virus gateway receives an SYN packet whose destination address is a port 80 and starts to establish a first connection and a second connection, that is, establish an HTTP proxy connection. A data packet of the client is redirected to the system for implementing network proxy, and the system for implementing network proxy extracts the data packet to perform virus scanning. An application protocol carried in the port 80 on the Internet is not necessarily the HTTP and may also be, for example, a Peer-to-Peer (P2P) protocol. If the P2P protocol is sent to the system for implementing network proxy, system resources are greatly consumed. In this case, if the proxy adapter detects that the data packet following the SYN packet sent by the client is not a packet based on the HTTP, the data packet is directly forwarded by the proxy adapter to the virtual network card, and does not need to be sent to the system for implementing network proxy for the virus scanning If the system for implementing network proxy is specifically a mail filtering gateway, a specific process is described as follows by taking a Simple Mail Transfer Protocol (SMTP) as an example. The system for implementing network proxy receives an SYN packet whose destination address is a port 25 and starts to establish a first connection and a second connection, that is, establish an SMTP proxy connection. A mail file sent by the client is redirected to the system for implementing network proxy to acquire and filter the mail file.

In the embodiments of the present invention, in the process of establishing the connection between the client and the server, the system for implementing network proxy establishes the first connection during first-time handshake, and after the client acquires the status information of the server, establishes the second connection according to the status information. In the process of establishing the second connection, the client establishes the third connection with the proxy server of the system for implementing network proxy, and the proxy client of the system for implementing network proxy establishes the fourth connection with the server, thereby shielding the service processing performed by the system for implementing network proxy on the data packet from a complex state of network links, and improving the user experience.

Persons of ordinary skill in the art should understand that all or a part of the steps of the methods according to the embodiments may be implemented by a program instructing relevant hardware. The program may be stored in a computer readable storage medium. When the program is run, the steps of the methods according to the embodiments are performed. The storage medium includes any medium that is capable of storing program codes, such as a Read-Only Memory (ROM), a Random Access Memory (RAM), a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method performed by a network entity for implementing a network proxy, the method comprising:
    establishing a first connection between a real client and a real server through a proxy adapter placed in the network entity, wherein the first connection enables the real client to acquire status information of the real server; and
    establishing a second connection between the real client and the real server if the status information of the real server shows that the real server is in a turn-on state, wherein the second connection enables the real client and the real server to transmit a data packet through the second connection;
    wherein establishing the second connection between the real client and the real server comprises, establishing a third connection between the proxy adapter and a proxy server through a triple handshake and establishing a fourth connection between the proxy adapter and a proxy client through a triple handshake; and
    wherein the proxy server and the proxy client are placed in the network entity.

2. The method according to claim 1, further comprising:
    disconnecting the first connection between the real client and the real server if the status information of the real server shows that the real server is in a turn-off state.

3. The method according to claim 1, wherein establishing the first connection between the real client and the real server through the proxy adapter comprises:
    receiving, at the proxy adapter, a first establishment request message sent by the real client, and sending, by the proxy adapter the first establishment request message to the real server;
    receiving, at the proxy adapter, a first establishment acknowledgement message from the real server, and sending, by the proxy adapter, the first establishment acknowledgement message to the real client; and
    receiving at the proxy adapter, a first connection acknowledgement message returned from the real client, and sending, by the proxy adapter, the first connection acknowledgement message to the real server.

4. The method according to claim 1, wherein transmitting a data packet through the second connection comprises:
    receiving, by the proxy server, the data packet sent by the real client through the third connection;
    performing_service processing on the data packet; and
    sending, by the proxy client, the processed data packet to the real server through the fourth connection.

5. The method according to claim 4, wherein performing the service processing on the data packet comprises at least one of the group consisting of: performing virus scanning on the data packet and filtering the data packet.

6. The method according to claim 5, further comprising:
    disconnecting the first connection between the real client and the real server if the status information of the real server shows that the real server is in the turn-off state.

7. A network entity for implementing a network proxy, the network entity comprising:
    proxy adapter;
    proxy client;
    proxy server;
    a processor; and
    a memory coupled to the processor;
    wherein the processor is configured to establish a first connection between a real client and a real server through the proxy adapter, so as to enable the real client to acquire status information of the real server through the first connection and to establish a second connection between the real client and the real server when the status information of the real server shows that the real server is in a turn-on state;
    wherein the second connection enables the real client and the real server to transmit data packets to one another; and
    wherein establishing a second connection between the real client and the real server comprises establishing a third connection between the proxy adapter and the proxy server through a triple handshake and establishing a fourth connection between the proxy adapter and the proxy client through a triple handshake.

8. The network entity according to claim 7, wherein establishing a first connection between the real client and the real server through proxy adapter comprises:
    receiving, at the proxy adapter, a first establishment request message sent by the real client and sending by proxy adapter, the first establishment request message to the real server;
    receiving, at the proxy adapter, a first establishment acknowledgement message from the real server and sending, by the proxy adapter the first establishment acknowledgement message to the real client; and
    receiving, adapter, a first connection acknowledgement message from the real client and sending, by the proxy adapter, the first connection acknowledgement message to the real server.

9. The network entity according to claim 7, wherein the processor is further configured to:
   receive a data packet sent by the real client through the third connection;
   perform service processing on the data packet; and
   send the processed data packet to the real server through the fourth connection.

10. The network entity according to claim 9, wherein the performing service processing on the data packet comprises at least one of the group consisting of:
    performing virus scanning on the data packet and filtering the data packet.

11. The method according to claim 4, wherein before performing virus scanning on the data packet, the method further comprises:
    detecting, by the proxy adapter, that the data packet is based on HTTP protocol; and
    if the data packet is not based on HTTP protocol, forwarding, by the proxy adapter, the data packet to a virtual network card in the network entity.

12. The network entity according to claim 9, wherein the proxy adapter is further configured to detect that the data packet is based on HTTP protocol and to forward the data packet to a virtual network card in the network entity if the data packet is not based on HTTP protocol.

* * * * *

UNITED STATES PATENT AND TRADEMARK OFFICE
CERTIFICATE OF CORRECTION

| | | |
|---|---|---|
| PATENT NO. | : 8,694,651 B2 | Page 1 of 1 |
| APPLICATION NO. | : 13/399518 | |
| DATED | : April 8, 2014 | |
| INVENTOR(S) | : Li | |

It is certified that error appears in the above-identified patent and that said Letters Patent is hereby corrected as shown below:

*In the Claims:*

*Column 10, Claim 4, Line 18 "performing_service" should read --performing service--.*

*Column 10, Claim 8, Line 64 "receiving, adapter" should read --receiving, at the proxy adapter--.*

Signed and Sealed this
Twenty-sixth Day of August, 2014

Michelle K. Lee
*Deputy Director of the United States Patent and Trademark Office*